US011815289B1

(12) United States Patent
Hernandez

(10) Patent No.: US 11,815,289 B1
(45) Date of Patent: Nov. 14, 2023

(54) ATTIC VENTILATION SYSTEM

(71) Applicant: Yasmany Hernandez, Tampa, FL (US)

(72) Inventor: Yasmany Hernandez, Tampa, FL (US)

( * ) Notice: Subject to any disclaimer, the term of this patent is extended or adjusted under 35 U.S.C. 154(b) by 284 days.

(21) Appl. No.: 17/409,753

(22) Filed: Aug. 23, 2021

(51) Int. Cl.
F24F 7/02 (2006.01)
H02S 20/22 (2014.01)
F24F 13/32 (2006.01)

(52) U.S. Cl.
CPC ............ F24F 7/025 (2013.01); H02S 20/22 (2014.12); F24F 13/32 (2013.01)

(58) Field of Classification Search
CPC .... F24F 7/025; F24F 13/32; F24F 2005/0064; H02S 20/22; H02S 20/23
See application file for complete search history.

(56) References Cited

U.S. PATENT DOCUMENTS

| 8,915,778 | B2 | 12/2014 | Boehling |  |
|---|---|---|---|---|
| 9,464,816 | B1 * | 10/2016 | Marks | F24F 7/025 |
| 9,582,011 | B2 | 2/2017 | Potter |  |
| 11,543,155 | B2 * | 1/2023 | Daniels | E04D 13/17 |
| 2012/0048351 | A1 * | 3/2012 | Rizzo | F24S 25/16 |
|  |  |  |  | 136/251 |

FOREIGN PATENT DOCUMENTS

CN 104882954 A * 9/2015

OTHER PUBLICATIONS

Translation, CN-104882954-A, Sep. 2015 (Year: 2015).*

* cited by examiner

Primary Examiner — Jessica Yuen
(74) Attorney, Agent, or Firm — SANCHELIMA & ASSOCIATES, P.A.; Christian Sanchelima; Jesus Sanchelima

(57) ABSTRACT

An attic ventilation system including a fan assembly, a power source assembly and an attic assembly is disclosed herein. The fan assembly includes fan blades, a fan housing and a motor, the fan housing covers the fan blades. The motor makes the blades rotate. The fan housing is attached to a window frame of an attic assembly by support bars. The power source assembly includes a solar panel attached to a support frame. The support frame is attached to the window frame by top support bars and bottom support bars. The top support bars are larger than the bottom support bars. The solar panel has an inclination to face a sun path. The solar panel supplies power energy to the motor. The fan assembly blows fresh air to an interior of an attic assembly.

6 Claims, 3 Drawing Sheets

ATTIC VENTILATION SYSTEM

BACKGROUND OF THE INVENTION

1. Field of the Invention

The present invention relates to an attic ventilation system and, more particularly, to an attic ventilation system that includes a solar powered fan and a solar panel that can be located instead of a front window of a roof.

2. Description of the Related Art

Several designs for attic ventilation systems have been designed in the past. None of them, however, include an attic ventilation system that can supply the attic with fresh air from outside.

Applicant believes that a related reference corresponds to U.S. Pat. No. 9,582,011 issued for an integrated attic ventilation. Applicant believes that another related reference corresponds to U.S. Pat. No. 8,915,778 issued for a hybrid solar attic vent comprising a housing configured to be mounted on the roof or in the gable of a building in communication with the attic of the building, wherein a photovoltaic solar panel is positioned to be exposed to sunlight and to power the attic fan when sufficient sunlight is present. However, none of them include a system comprising a solar panel and solar power fan that can be mounted instead of a glass window of an attic, bringing fresh air from outside to the attic.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a system comprising a solar panel and a powered-solar fan to refresh an attic during the day.

It is another object of this invention to provide a ventilation system that can supply fresh air from outside to an attic, expelling the hot air from inside the attic to outside.

It is still another object of the present invention to provide a system that can refresh an attic saving on the energy bills, since the solar-powered fan only would work on hot days, when there is sun to power the fan.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 3 shows a side view of the power assembly 40 attached to a window frame 62 by top support bars 46 and bottom support bars 46a.

DETAILED DESCRIPTION OF THE EMBODIMENTS OF THE INVENTION

Figure 1:
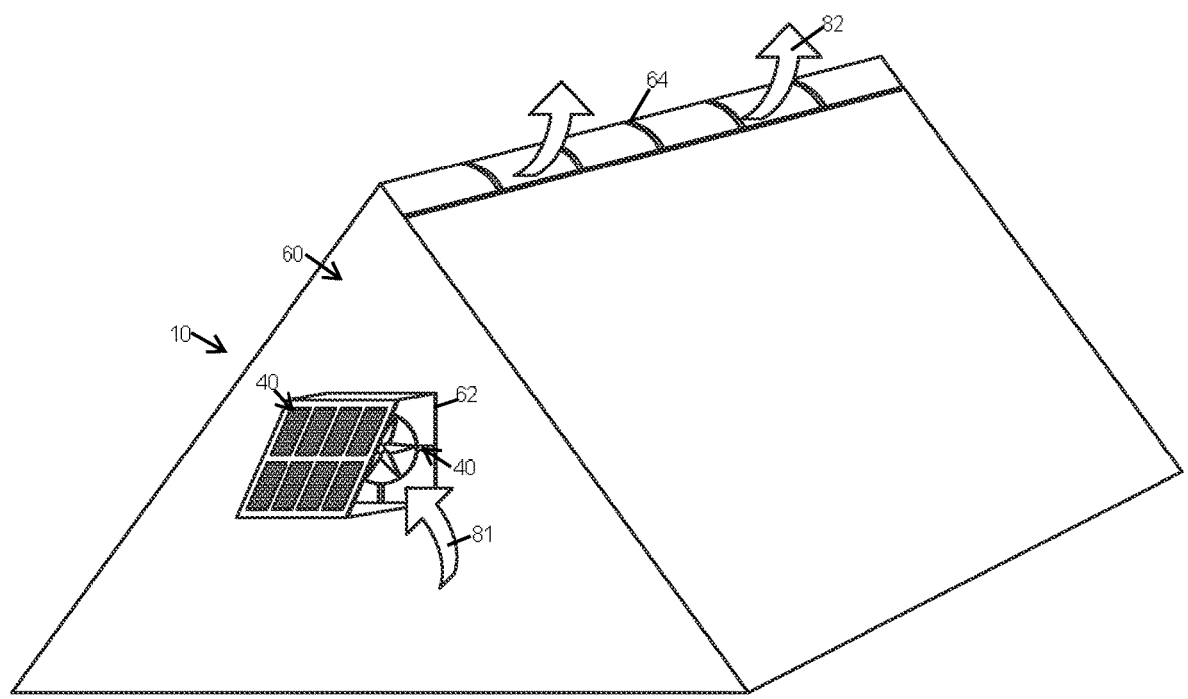
FIG. 1 represents an operational view of the present invention 10. The fan assembly 20 and the power source assembly 40 are attached to a window frame 62 of an attic assembly 60. The fan assembly is blowing fresh air 80 to an interior of the attic assembly. Hot air 82 is being expelled through ridges vent 64.
Figure 2:
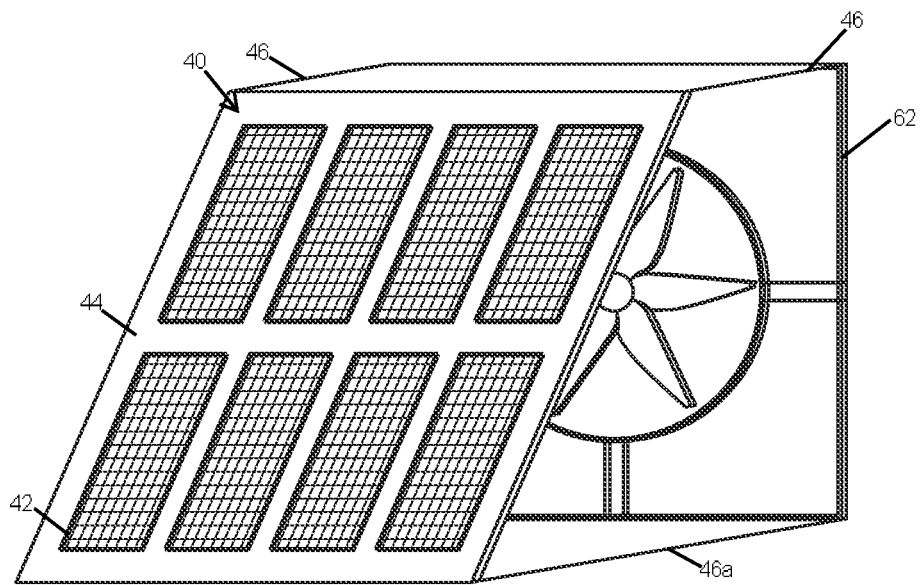
FIG. 2 illustrates an isometric view of the power source assembly 40 attached to a window frame 62. A fan assembly 40 is also attached to the window frame 62.

Referring now to the drawings, where the present invention is generally referred to with numeral 10, it can be observed that it basically includes a fan assembly 20, a power source assembly 40 and an attic assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 4:
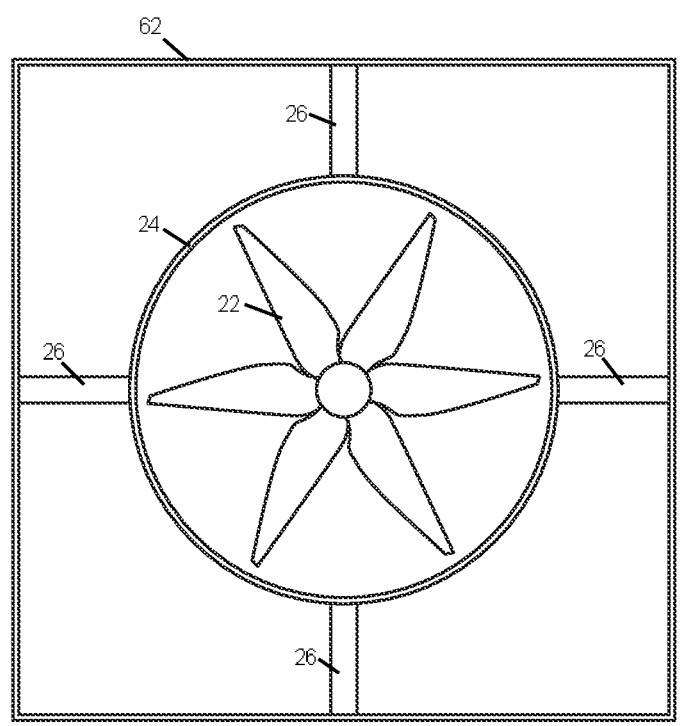
FIG. 4 is a front view of the fan assembly 20. The fan assembly 20 is attached to a window frame 62 by support bars 26.

The fan assembly 20 includes fan blades 22 connected to a shaft 24b of a motor 24. Best observed in FIG. 4, each of the fan blades 22 includes a blade proximal end and a blade distal end. Each of the fan blades 22 have an elongated shape. The blade distal and may have a width less than width of the blade proximal end. Each of the fan blades 22 may have the same length. The fan blades 22 may be made of plastic, metal, carbon fibers or any other rigid material. The fan assembly also may include a fan housing 24 to protect the fan blades 22. The fan housing 24 may have a circular shape. In a preferred embodiment, the fan housing 24 may be made of metal. It also may be suitable for the fan housing to be made of wood, plastic, carbon fibers or any other material with high resistance and strength. The fan housing 24 may be mounted to a window frame 62 of the attic assembly 60 by support bars 26. Each of the support bars 26 may have substantially the same length. The support bars 26 may have a cylindrical shape. Other embodiments for the support bars 26 may include a rectangular shape, a beam shape or any other shape. In a preferred embodiment, the support bars 26 may be made of metal. The support bars 26 may have a coating to avoid corrosion. A first distal end of each of the support bars 26 may be connected to an external surface of the fan housing 24 by welding. It also may be suitable to connect the first distal end of each of the support bars 26 to the fan housing 24 by bolts, rivets or the like. A second distal end of each of the support bars 26 may be connected to an interior surface of the window frame 62 by welding. It also may be suitable to connect the second distal end of each of the support bars 26 to the window frame 62 by bolts, rivets or the like. In a preferred embodiment, the window frame 62 may have a squared shape. It also may be suitable for the window frame 62 to have a circular, triangular, oval or any other shape. The perimeter of the window frame 62 may be greater than the perimeter of the fan housing 24. The window frame 62 may be made of metal, carbon fibers, plastic, wood or any other material with high strength and resistance.

Figure 3:
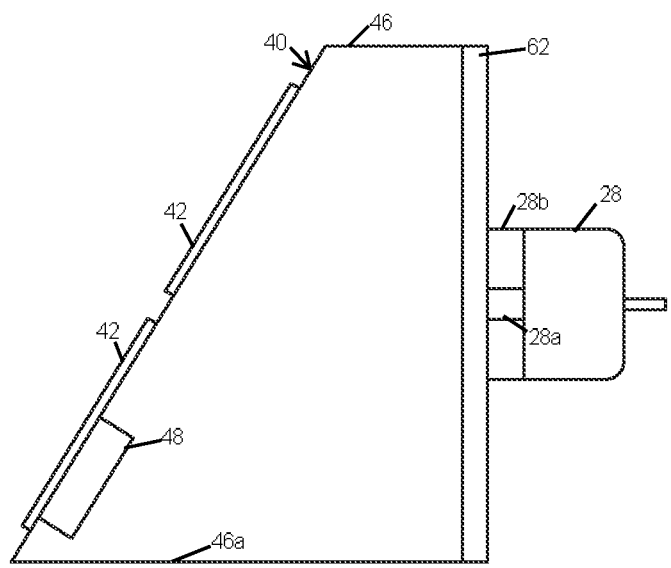

As it can be observed in FIG. 3, a shaft 28a may transmit movement from a motor 28 to the fan blades 22. The shaft 28a may be made of metal. The motor 28 may be an electric motor of direct current. The motor 28 may include a motor housing 28b. The motor housing 28 may be attached to the fan housing 24 by welding. It also may be suitable to attach the motor housing 28 to the fan housing 24 by bolts, rivets or the like.

The power source assembly 40 may include a solar panel 42. The solar panel 42 may have a squared shape. It also may be suitable for the solar panel to have a triangular, circular, oval or any other shape. The solar panel 42 may transform solar energy to electric energy. The solar panel 42 may be connected to a voltage regulator 48 to regulate the current and avoid energy fluctuations. The voltage regulator 48 may be connected to the motor 28 to supply the electric energy to rotate the fan blades 22 of the fan assembly 20. The solar panel 42 may be attached to a support frame 44. The support frame 44 may have a squared shape. It also may be suitable for the support frame 44 to have a circular, triangular or any other shape. Length and width of the support frame 44 may be greater than length and width of the solar panel 42. The support frame 44 may be made of metal, wood, carbon fibers or any other material with high strength. It may be suitable for the support frame 44 to have a coating to avoid corrosion.

The support frame 44 may be attached to the window frame by top support bars 46 and bottom support bars 46a. The top support bars 46 and bottom support bars 46a may have a circular, rectangular or any other shape. In a preferred embodiment, the top support bars 46 and bottom support bars 46a may be of metal. In other embodiments, the top support bars 46 and bottom support bars 46a may be made of wood, carbon fibers or any other material with high strength. It may be suitable for the top support bars 46 and bottom support bars 46a to have a coating. The bottom support bars 46a may have a larger length than the top support bars 46. A first distal end of each of the bottom support bars 46a may be welded to bottom corners of the support frame 44. A second distal end of each of the bottom support bars 46a may be welded to bottom corners of the window frame 62. A first distal end of each of the top support bars 46 may be welded to top corners of the support frame 44. A second distal end of each of the top support bars 46 may be welded to top corners of the window frame 62.

The top support bars 46 and bottom support bars 46a may form a separation between the fan assembly 20 and the support frame 44 to allow the fresh air 81 to be blown to an interior of an attic assembly 60. The fan assembly 20 may blow fresh air 81 to the interior of the attic assembly 60. The fan assembly 20 may blow hot air 82 out of the attic assembly 60. The hot air 82 may be expelled out of the attic assembly 60 through ridges vent 64. The support frame 44 may have an inclination to face a sun path.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An attic ventilation system, comprising:
   a. a fan assembly including fan blades, a fan housing and a motor, said fan housing covering said fan blades, said motor actuates the fan blades, said fan housing is attached to a window frame of an attic assembly by means of first support bars, wherein said first support bars are four support bars equidistantly spaced and welded to said fan housing, said first support bars welded to a right side, a left side, a top side and a bottom side of said fan housing;
   b. a power source assembly including a solar panel attached to a support frame, said support frame has a rectangular shape said support frame is solid having a planar surface, said support frame is attached to the window frame by top support bars and bottom support bars, wherein proximal ends of said top support bars and said bottom support bars are welded to top corners and bottom corners of said window frame, respectively, said distal ends of said top support bars and said bottom support bars are welded to top corners and bottom corners of said support frame, wherein said bottom support bars and said top support bars are made of metal, said solar panel supplies electric power to said motor, wherein said solar panel is connected to a voltage regulator to avoid voltage fluctuation that could damage the motor; and
   c. said fan assembly is configured to blow fresh air to an interior of the attic assembly, said fan assembly is configured to blow hot air out of the attic assembly, said hot air is expelled through ridges vent of the attic assembly.

2. The attic ventilation system of claim 1, wherein said bottom support bars are larger than said top support bars.

3. The attic ventilation system of claim 1, wherein said first support bars are made of metal.

4. The attic ventilation system of claim 1, wherein said solar panel has an inclination configured to face a sun path.

5. The attic ventilation system of claim 1, wherein said motor is an electric motor of direct current.

6. The attic ventilation system of claim 1, wherein said fan assembly and said power source assembly are welded to the window frame.

* * * * *